April 8, 1947.　　　J. W. TETER　　　2,418,562
PRODUCTION OF NITRILES FROM PROPYLENE AND AMMONIA
Filed May 22, 1942
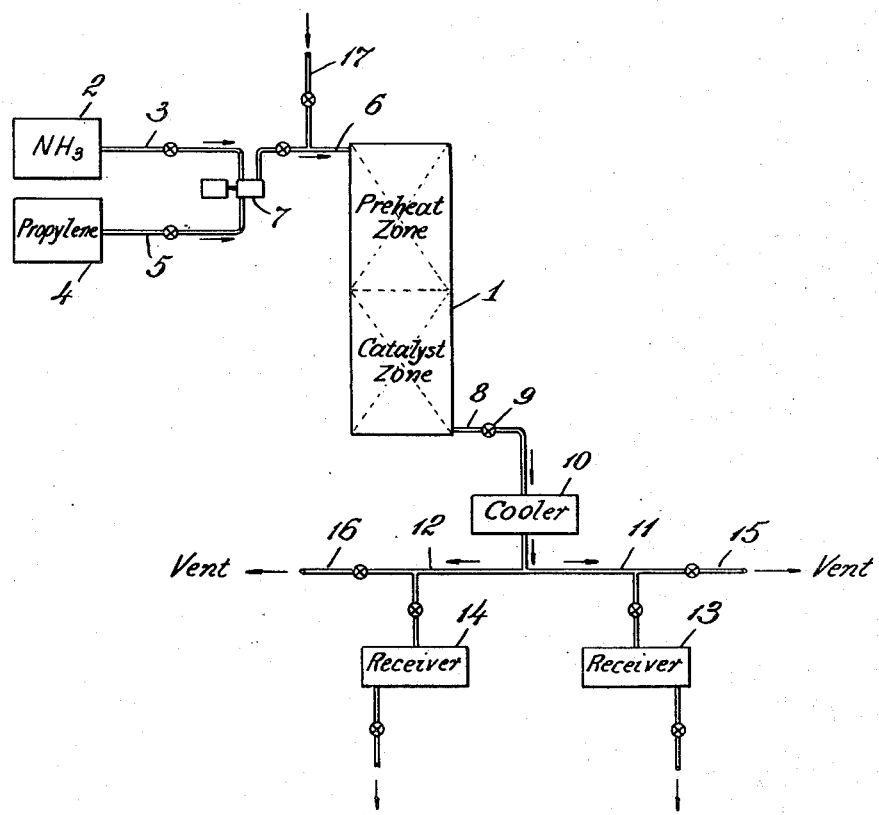
INVENTOR
John W. Teter
BY
Pennie, Davis, Marvin & Edmonds
ATTORNEYS Patented Apr. 8, 1947

2,418,562

UNITED STATES PATENT OFFICE 2,418,562

PRODUCTION OF NITRILES FROM PROPYLENE AND AMMONIA

John W. Teter, Chicago, Ill., assignor to Sinclair Refining Company, New York, N. Y., a corporation of Maine Application May 22, 1942, Serial No. 444,094

7 Claims. (Cl. 260—464)

This invention relates to an improved process for the production of organic nitrogen compounds, primarily nitriles from olefinic hydrocarbons and ammonia.

The amination of olefins by reaction with ammonia in the presence of a catalyst has previously been proposed. However, the production of nitriles by this method has been seriously interfered with by several competing reactions which occur under conditions generally favorable to the amination reaction.

For instance, the catalytic reaction of olefins with ammonia to form nitriles is favorably influenced by elevated temperatures. Unfortunately, cracking and polymerization reactions are also promoted by elevated temperatures. Further, materials which have been found to function as catalysts for the desired reactions also promote cracking, polymerization and hydrogenation to such an extent as greatly to reduce the yields of the desired organic nitrogen compounds.

My present invention relates more particularly to an improved catalytic process for the production of nitriles from propylene and ammonia. The invention resides primarily in my discovery of operating conditions which favor the reaction or reactions resulting in the production of the desired nitriles and which are relatively unfavorable to the undesirable competing side reactions.

In accordance with my improved process, nitriles suitable for use in the synthesis of various commodities including synthetic rubber and silks may be economically produced from propylene or from hydrocarbon mixtures containing propylene such as refinery gases produced in abundance in the refining of petroleum oils.

Briefly, my improved process comprises contacting an admixture of ammonia and propylene or a hydrocarbon mixture rich in propylene with a catalyst selectively promoting amination and under conditions which I have found further selectively to promote the desirable reaction or reactions.

Preferably, a fixed bed of the catalytic mass is maintained in a reaction zone and the ammonia-olefin mixture is passed through this bed under conditions presently to be described. The catalytic mass composing this fixed bed may be in the form of pellets or in unpelleted form adapted to permit the flow of the reacting mixture through the bed uniformly and at the desirable space velocity.

On the accompanying drawing there is presented a diagrammatic flow chart which illustrates one method of carrying out my improved process. It will be understood, however, that my invention is not limited to the particular embodiment there represented.

I shall illustrate the process of my present invention with reference to the flow diagram shown as carried out under operating conditions which I have found most advantageous. However, it will be understood that the respective operating conditions may be varied somewhat from the specific conditions used in this illustration without departing from the spirit and scope of the invention.

In this flow diagram the bed of catalytic mass is maintained in the lower part of the chamber 1, which chamber is capable of withstanding the temperature and pressure conditions of the process. This chamber is adapted to be heated by conventional means, for instance electrically or by a steam jacket. The upper portion of this chamber constitutes a preheating zone and is advantageously filled with a suitable filling or heat-exchange material, for instance Raschig rings, so as to effect uniform heating of the mixture to be passed through the catalyst bed.

Liquid ammonia is withdrawn from the ammonia feed tank 2 through valved connection 3 and liquid propylene or a hydrocarbon mixture rich in propylene is withdrawn from supply tank 4 through valved connection 5. These materials are admixed and passed under pressure of about 3000 pounds per square inch through valved connection 6 into the preheating zone of chamber 1 by means of the proportioning pump 7.

The proportions of ammonia and propylene or hydrocarbon mixture thus passed to the preheating zone is advantageously maintained such that the molar ratio of ammonia to the propylene constituent in the mixture is about 4 or 5:1 and the amount of this mixture passed through the reaction zone is advantageously maintained at a value such that the space velocity of the mixture with respect to the catalytic mass is about 0.15 to 0.2 based on the liquid propylene content of the mixture.

In its downward passage through the preheating zone of chamber 1 the ammonia-propylene mixture is uniformly heated to a temperature of about 700° F., and is maintained at about this temperature and under a pressure of about 3000 pounds per square inch during the passage of the mixture through the bed of catalyst mass in the lower part of chamber 1.

The reaction products pass from the bottom of the chamber 1 through connection 8 and pressure-control valve 9 to the cooler 10 and from thence through lines 11 or 12 into one of the pressure receivers 13 or 14. While pressure receivers with valved connections leading to each are shown in the drawing, it will be understood that only one need be used at any one time. By providing two receivers, the product may be accumulated in one while the other is being emptied. Pressure on the system may be controlled by the pressure control valve 9. I have found it advantageous, however, to collect the gaseous and liquid products of the reaction together in the pressure receiver and subsequently to stabilize and separate the gaseous products from the liquid in conventional fractionating apparatus.

As will subsequently be described in greater detail, the catalyst mass becomes less effective upon continued use. Its effectiveness may be restored by discontinuing the passage of the ammonia-propylene mixture to the chamber 1, purging the chamber of the mixture and passing hydrogen through the catalyst bed at an elevated temperature. This may be accomplished in the apparatus conventionally illustrated in the flow diagram by stopping the pump 7, closing the valve in line 6 and in lines leading from the cooler to receivers 13 and 14, opening the valves in the vent-lines 15 or 16, or both, and passing the purging gas and finally hydrogen to the system through valve connection 17.

It will be understood that my invention is not predicated upon any theory as to the chemical reactions involved in the production of the nitriles of my improved process. It is my present belief, however, that the ammonia first reacts with the propylene to form an amine and that, under the conditions existing in the reaction zone, the amine is dehydrated to form the nitrile. These reactions may be represented generally by the following equations:

(1) 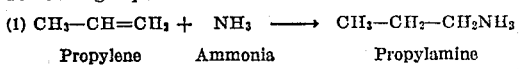

Propylene     Ammonia     Propylamine (2) 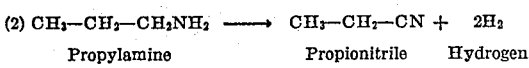

Propylamine     Propionitrile     Hydrogen

While the reactions represented by the above equations probably do occur to a considerable extent in my process, it is apparent from the results of numerous tests which I have conducted that the chemistry involved is much more complicated than is indicated by the equations.

For example, the nitrile product of my process does not consist exclusively of propionitrile but includes a considerable proportion of acetonitrile and butyronitrile. Also, appreciable quantities of valeronitrile and caproionitrile have been found to be present in the product. Usually not more than about 30% to 40% of the nitrogen-containing product is propionitrile. Generally acetonitrile and butyronitrile are present in the product in about equal proportions and constitute about 40% to 50% of the organic nitrogen compounds in the product.

These proportions of acetonitrile and butyronitrile present in the product cannot be accounted for by the proportions of ethylene or butylene present in the hydrocarbon charged to the process and, accordingly, must result from reactions occuring during the process.

For example, in charging a hydrocarbon mixture containing ethylene, propylene and butylene in such proportions that the theoretical molar proportions of aceto-, propio- and butyronitriles produced would be 3:94:3, the actual molar ratio of the respective nitriles in the product has been found to be approximately 40:40:20. It would appear, therefore, that the reactions involved include carbon-carbon-scission and the union of carbon atoms either prior to or subsequent to the reaction with the ammonia.

Repeated tests have shown very litle methane and hydrogen to be present in the hydrocarbon gases which survive the process. Further, I have detected no hydrocyanic acid in the product or the effluent gases. It appears, therefore, that, if methane, hydrogen or hydrocyanic acid are formed by the reactions involved, they enter into further reactions before leaving the operation.

It may be that, under the conditions of the process, a portion of the propionitrile formed is broken down to ethylene and HCN, the ethylene reacting with the ammonia to form ethylamine, which is dehydrogenated to acetonitrile and the HCN reacting with propylene directly to form butyronitrile.

As previously noted, there is also present in operations of this type, involving high temperatures, a tendency for the olefin to crack, to become hydrogenated and to polymerize. Hydrogen resulting from the cracking of the hydrocarbon becomes available for the hydrogenation of the olefin which would have the effect of lowering the yield of nitrile on the basis of olefin consumed. Polymerization of the olefin likewise adversely affects the yield of the nitriles. Accordingly, it is highly desirable to discourage to the fullest extent cracking, hydrogenation and polymerization of the olefin. In this respect my improved process is a decided advance in the art for, though these competing side reactions usually are not entirely prevented, they are very materially reduced.

The result of these competing reactions, even under favorable conditions, is usually apparent to some extent, at least from the composition of the hydrocarbons passing from the process uncombined with nitrogen as compared with the composition of the hydrocarbon mixture charged to the process. For example, in a specific operation of my improved process, using a cobalt catalyst presently to be described, a pressure of 3000 pounds per square inch, a temperature of 700° F., and a molar ratio of ammonia to olefin of 4.84:1, the liquid compositions of the hydrocarbon feed stock and of the acid insoluble release gases from the stabilization of the product were as follows:

|  | Feed Stock | Release Gases |
|---|---|---|
| Methane | None | 3.9 |
| Ethane | 1.0 | None |
| Ethylene | None | 1.7 |
| Propane | 17.0 | 32.1 |
| Propylene | 82.0 | 53.3 |
| Hydrocarbons of more than 3 carbon atoms | None | 4.5 |

In this particular operation the percentage of unreacted propylene recovered based on that present in the charging stock was about 65% and the total percentage of organic nitrogen compounds produced, calculated as propionitrile and based on the olefin charge, was approximately 15%.

I have found that, at a temperature of 700° F., the operation is about 220% as effective with respect to nitrogen fixation as at a temperature of 550° F., other conditions being comparable, and over 200% as effective as operations at 650° F. Further, the lower temperatures usually favor polymerization.

Also, I have found that at a pressure of 3000 pounds per square inch the nitrogen fixation effected is about 150% that obtained at 2000 pounds per square inch, other operating conditions being comparable. The cracking reaction and also polymerization appear to be favored by the lower pressure. At 2000 pounds per square inch the polymerization is about twice that which occurs at 3000 pounds per square inch. While at 1000 pounds per square inch, polymerization has been found to be less than at 2000 pounds per square inch, the ratio of non-nitrogenous polymer to nitrogen compound produced is still much greater than at 3000 pounds per square inch, other conditions being comparable.

The efficiency of the process has also been found to be influenced by the ratio of ammonia to olefins and the space velocity of the mixture through the catalyst bed. For temperatures of about 700° F., and pressures approximating 3000 pounds per square inch, I have obtained most efficient overall results where the molar ratio of the ammonia to propylene is about 4 or 5:1 and the space velocity of the propylene through the catalyst is about 0.15:0.2.

By the proper correlation of these various operating conditions which I have found favorably to influence the operation, I am able not only to increase the yield of nitriles but also to decrease the proportion of the olefin lost by cracking, hydrogenation and polymerization and thus increase the proportion of propylene recoverable and available for reprocessing.

In addition to the proper correlation of temperature, pressure, space velocities and proportions of reactants, I have found that the yields of nitriles and the dissipation of olefin through side reactions are also influenced to a considerable extent by the particular catalyst used. Generally cobalt and nickel catalyst have been found to be most effective and of the two cobalt is generally superior to nickel in the process of my present invention. These catalysts are preferably used as suspensions on so-called carriers.

Further, I have found that the yields of nitriles and also the extent of the previously mentioned undesirable side reactions, are influenced to a considerable extent by the selection of the carrier on which the cobalt or nickel is suspended and also the proportions of the metallic catalyst deposited thereon. Superior results have been obtained using the following catalysts:

1. A 40%–50% suspension of cobalt or nickel on acid-treated bentonite which, prior to the precipitation of the metallic catalyst thereon, has been subjected to a severe heat-treatment and which is described and claimed in my copending application Serial No. 444,097, filed May 22, 1942 now Patent #398,899;

2. A suspension of approximately 50% cobalt on a diatomaceous silica consisting essentially of the silica remains of marine plankton diatoms and a minor proportion of aluminum oxide which is described and claimed in my co-pending application Serial No. 444,095, filed May 22, 1942;

3. A suspension of approximately 40%–60% cobalt on hydrated magnesium silicate described and claimed in my co-pending application Serial No. 444,096, filed May 22, 1942.

As previously indicated, after a period of use, the effectiveness of the catalyst diminishes. Since the cost of replacement of catalyst is prohibitive, it is essential that the catalyst be regenerated. This is readily accomplished by passing hydrogen in contact therewith at an elevated temperature. For example, hydrogen may be passed through a bed of catalyst as previously indicated at a temperature of 650° F.–750° F., for a period from about 12–50 hours, depending upon the degree of degeneration.

I have found that more uniform operating conditions may be maintained by periodically regenerating the catalyst before its selective activity has been greatly reduced. For instance, on operating schedule whereby the amination process is conducted for a period of about 12 hours and the catalyst then regenerated by passing hydrogen therethrough for a period of about 6–12 hours has been found advantageous. However, the duration of the alternate periods of operation and regeneration may be varied to meet particular operating requirements or conditions. It is generally desirable to purge the catalyst by passing ammonia therethrough prior to and following the reactivation with hydrogen.

The range of operating conditions of my improved process will be illustrated by the following tabulation of operating conditions and results obtained in specific examples of the use of my process in apparatus of the general type previously described.

| Example No. | 1 | 2 | 3 | 4 | 5 | 6 |
|---|---|---|---|---|---|---|
| Temperature, ° F. | 700 | 700 | 700 | 700 | 700 | 700 |
| Pressure, Lbs./sq. in. | 3,000 | 1,000 | 3,000 | 3,000 | 3,000 | 3,000 |
| Space Velocity Based on Olefin Charge | 0.386 | 0.524 | 0.166 | 0.169 | 0.158 | 0.173 |
| Molar Ratio NH$_3$: Propylene | 4.84 | 4.1 | 7.15 | 5.88 | 5.43 | 5.5 |
| Product Based on Weight of Propylene Charged | 19.4 | 16.6 | 20.2 | 20.5 | 25.8 | 38.5 |
| Total Nitrogen Compounds Calculated as Propionitrile, % | 15.1 | 9.9 | 13.4 | 13.4 | 18.9 | 24.6 |
| Non-nitrogenous Polymers, % | 4.3 | 6.7 | 6.8 | 7.1 | 6.9 | 13.9 |
| Catalyst in Use, Total Hours | 13 | 18 | 104 | 116 | 12 | 96 |

In each of the foregoing examples, the catalyst used was the previously-mentioned type comprising about 50% of cobalt suspended on diatomaceous silica. In Examples 1 and 2 the hydrocarbon constituent of the charge was a commercial grade of propylene having approximately the following composition:

|  | Per cent |
|---|---|
| Ethane | 1 |
| Propane | 17 |
| Propylene | 82 |

In Examples 3 to 6, inclusive, the hydrocarbon constituent of the charge was a refinery product having the following composition:

|  | Per cent |
|---|---|
| Ethane | 13.2 |
| Ethylene | 0.7 |
| Propane | 51.7 |
| Propylene | 31.4 |
| Butane | 3.0 |

| Example No. | 7 | 8 | 9 | 10 | 11 | 12 |
|---|---|---|---|---|---|---|
| Temperature, ° F. | 700 | 725 | 700 | 750 | 800 | 700 |
| Pressure, Lbs./sq. in. | 3,000 | 3,000 | 3,000 | 3,000 | 3,000 | 3,000 |
| Space Velocity Based on Olefin Charge | 0.179 | 0.188 | 0.158 | 0.158 | 0.159 | 0.174 |
| Molar Ratio NH$_3$: Propylene | 4.34 | 4.6 | 6.5 | 6.1 | 5.75 | 4.92 |
| Product Based on Weight of Propylene Charged | 14.1 | 16.9 | 34.2 | 19.0 | 21.0 | 19.1 |
| Total Nitrogen Compounds Calculated as Propionitrile, % | 10.3 | 12.5 | 26.7 | 14.2 | 15.0 | 14.4 |
| Non-nitrogenous Polymers, % | 3.8 | 4.4 | 7.5 | 4.8 | 6.0 | 4.7 |
| Catalyst in Use, Hrs. | 41.5 | 53.5 | 90 | 102 | 114 | 152 |

In each of the foregoing examples, the hydrocarbon constituent of the charge was the same as that used in Examples 3 to 6, inclusive. In Examples 7 and 8 the catalyst was a suspension of about 50% nickel on diatomaceous silica and in Examples 9 to 12, inclusive, the catalyst was a 50% suspension of cobalt on a carrier consisting of especially prepared bentonite, each of the carriers being of the type previously described.

Though I have indicated certain operating conditions to be most advantageous, it will be understood that my invention in its broader aspect comprehends variations in operating conditions within specified ranges which I have found to be beneficial as illustrated by the foregoing examples. Generally, in the operation of my process the operating temperature may be varied from about 650° F.–800° F. and the operating pressure from about 1000–3000 pounds per square inch. Space velocities based on the olefin charge within a range of about 0.15 to about 0.5 and molecular ratios of ammonia to propylene within the range of about 3 to about 7:1 have been used with particular advantage.

However, as previously indicated, I have obtained generally more satisfactory results by operating at a temperature of about 700° F., a pressure of about 3000 pounds per square inch, a space velocity based on propylene charge of about 0.17 and a ratio of ammonia to propylene of about 4 or 5:1. Under these conditions, I have obtained the maximum amination with a minimum dissipation of propylene through the undesirable competing reactions.

Within the specified range of operating conditions there is not a great variation in the ratio of acetonitrile, propionitrile and butyronitrile in the nitrogen compound product. However, variations from the preferred conditions have generally been found to affect detrimentally the total yields of nitrogen compounds and the relative extent of competing reactions. These facts are illustrated by the following tabulation of total yields and of the analysis of the product obtained under the preferred operating conditions and under operating conditions varying therefrom in some one respect, other conditions being comparable. In each instance the operating conditions under which the product was obtained are indicated in the tabulation.

| Example No. | 13 | 14 | 15 | 16 |
|---|---|---|---|---|
| Temperature, ° F. | 700 | 700 | 650 | 700 |
| Pressure, Lbs./sq. in. | 3,000 | 1,000 | 3,000 | 3,000 |
| Space Velocity Based on Olefin Charge | 0.17 | 0.17 | 0.18 | 0.30 |
| Molar Ratio NH₃: Propylene | 5.0:1.0 | 5.3:1.0 | 4.8:1.0 | 5.4:1.0 |
| Product Based on Weight of Propylene Charged: | | | | |
| Acetonitrile | 3.4 | 3.2 | 1.6 | 1.2 |
| Propionitrile | 3.3 | 2.4 | 1.7 | 2.5 |
| Butyronitrile | 3.0 | 2.0 | 1.4 | 2.3 |
| Unidentified Nitrogen Compounds | 2.1 | 1.4 | 1.0 | 1.5 |
| Total Nitrogen Compounds | 11.8 | 9.0 | 5.7 | 7.5 |
| Non-nitrogenous Polymer | 6.1 | 6.0 | 4.5 | 5.4 |

I claim:

1. In the production of nitriles, the improvement which comprises reacting propylene with ammonia in the presence of a catalyst of the class consisting of cobalt and nickel at a temperature within the range from about 650 to about 800° F. and a pressure within the range from about 1000 to about 3000 pounds per square inch.

2. In the production of nitriles, the improvement which comprises reacting propylene with ammonia in the presence of a catalyst of the class consisting of cobalt and nickel at a temperature within the range from about 650 to about 800° F. and a pressure within the range from about 1000 to about 3000 pounds per square inch, the molar ratio of ammonia to propylene being within the range from about 3:1 to about 7:1.

3. In the production of nitriles, the improvement which comprises passing an admixture of ammonia and propylene in which the molar ratio of ammonia to propylene is within the range from about 3:1 to about 7:1 through a catalytic mass comprising a metallic catalyst of the class consisting of cobalt and nickel at a temperature within the range from about 650 to 800° F., and a pressure within the range from about 1000 to about 3000 pounds per square inch.

4. In the production of nitriles, the improvement which comprises passing an admixture of ammonia and propylene in which the molar ratio of ammonia to propylene is within the range from about 3:1 to about 7:1 through a catalytic mass comprising a metallic catalyst of the class consisting of cobalt and nickel at a temperature within the range from about 650 to about 800° F., a pressure within the range from about 1000 to about 3000 pounds per square inch and a space velocity within the range of about 0.15 to about 0.5.

5. In the production of nitriles, the improvement which comprises passing an admixture of ammonia and propylene in which the molar ratio of ammonia to propylene is within the range from about 3:1 to about 7:1 through a catalytic mass comprising a metallic catalyst of the class consisting of cobalt and nickel at a temperature of about 700° F., a pressure of about 3000 pounds per square inch and a space velocity within the range of about 0.15 to about 0.5.

6. In the production of nitriles, the improvement which comprises passing an admixture of ammonia and propylene in which the molar ratio of ammonia to propylene is within the range from about 4:1 to about 5:1 through a catalytic mass comprising a metallic catalyst of the class consisting of cobalt and nickel at a temperature of about 700° F., a pressure of about 3000 pounds per square inch and a space velocity within the range of about 0.15 to about 0.2.

7. In the production of nitriles, the improvement which comprises passing an admixture of ammonia and propylene in which the molar ratio of ammonia to propylene is within the range from about 4:1 to about 5:1 through a catalytic mass comprising cobalt at a temperature of about 700° F., a pressure of about 3000 pounds per square inch and a space velocity within the range of about 0.15 to about 0.2.

JOHN W. TETER.

REFERENCES CITED

The following references are of record in the file of this patent:

UNITED STATES PATENTS

| Number | Name | Date |
|---|---|---|
| 1,920,795 | Jaeger | Aug. 1, 1933 |
| 1,992,615 | Hoffman et al. | Feb. 26, 1935 |
| 2,053,193 | Guinot | Sept. 1, 1936 |
| 2,115,884 | Schollkopf | May 3, 1938 |
| 1,973,474 | Egloff et al. | Sept. 11, 1934 |

FOREIGN PATENTS

| Number | Country | Date |
|---|---|---|
| 479,079 | German | Sept. 20, 1930 |
| 406,700 | British | Mar. 1, 1934 |